United States Patent
Thome et al.

(10) Patent No.: US 12,229,549 B2
(45) Date of Patent: Feb. 18, 2025

(54) SCALABLE CODE TESTING AND BENCHMARKING

(71) Applicant: GitLab Inc., San Francisco, CA (US)

(72) Inventors: Julian Thome, Esch/Alzette (DE); James Johnson, Sammamish, WA (US); Isaac Dawson, Yokohama (JP); Dinesh Bolkensteyn, San Francisco, CA (US); Michael Henriksen, San Francisco, CA (US); Mark Art, Mosman (AU)

(73) Assignee: GitLab Inc., San Francisco, CA (US)

(*) Notice: Subject to any disclaimer, the term of this patent is extended or adjusted under 35 U.S.C. 154(b) by 40 days.

(21) Appl. No.: 17/964,832

(22) Filed: Oct. 12, 2022

(65) Prior Publication Data
US 2024/0126542 A1   Apr. 18, 2024

(51) Int. Cl.
*G06F 9/44* (2018.01)
*G06F 8/658* (2018.01)
*G06F 8/71* (2018.01)

(52) U.S. Cl.
CPC .......... *G06F 8/71* (2013.01); *G06F 8/658* (2018.02); *G06F 11/3604* (2013.01); *G06F 11/3672* (2013.01)

(58) Field of Classification Search
None
See application file for complete search history.

(56) References Cited

U.S. PATENT DOCUMENTS

| | | | |
|---|---|---|---|
| 7,735,078 B1* | 6/2010 | Vaidya | G06F 9/44547 717/172 |
| 11,232,097 B1* | 1/2022 | Antao | G06F 8/41 |
| 11,544,050 B1* | 1/2023 | Ankit | G06F 11/3668 |
| 2017/0168798 A1 | 6/2017 | Lang et al. | |
| 2017/0199737 A1* | 7/2017 | Bofferding | G06F 11/3692 |
| 2017/0277517 A1 | 9/2017 | Petitgrand et al. | |
| 2018/0067740 A1 | 3/2018 | Bofferding et al. | |
| 2020/0250074 A1* | 8/2020 | Zhang | G06F 11/3664 |

(Continued)

OTHER PUBLICATIONS

Gitlab, "sourcewarp," undated, 6 pages, [Online] [Retrieved on May 2, 2023] Retrieved from the internet <URL: https://gitlab.com/gitlab-org/vulnerability-research/foss/sourcewarp>.

(Continued)

*Primary Examiner* — Wei Y Zhen
*Assistant Examiner* — Lanny N Ung
(74) *Attorney, Agent, or Firm* — Fenwick & West LLP

(57) ABSTRACT

A method or system for testing and benchmarking commits made on source code. The system extracts commits from a history of a first code history that records a sequence of commits made thereon. The extracted commits are then combined into a sequence of patches, each of which includes changes made during consecutive commits. The system also establishes a connection with a system under test (SUT) having a second code repository corresponding to a historical version of the first code repository before the extracted commits were made, and sequentially applies the sequence of the patches to the second code repository. Performance of the SUT is monitored during the application of the sequence of the patches to determine whether the SUT performs as expected after the application of each patch.

16 Claims, 5 Drawing Sheets

(56) References Cited

U.S. PATENT DOCUMENTS

2021/0042216 A1* 2/2021 Magnezi ............... G06F 8/658
2022/0091969 A1* 3/2022 Han ...................... G06F 11/3692

OTHER PUBLICATIONS

Gitlab, "Advanced vulnerability tracking," undated, 19 pages, GitLab 14.2. [Online] [Retrieved on May 2, 2023] Retrieved from the internet <URL: https://docs.gitlab.com/ee/user/application_security/sast/#advanced-vulnerability-tracking>.

Kamalbasha, S. et al., "Bayesian A/B Testing for Business Decisions," Data Science—Analytics and Applications: Proceedings of the 3rd International Data Science Conference-iDSC2020, arXiv:2003.02769v1, Mar. 5, 2020, pp. 50-57.

KPMG, "Agile Transformation," KPMG Advisory N.V. 2019, pp. 1-42.

Li, P. L. et al., "Evolving Software to be ML-Driven Utilizing Real-World A/B Testing: Experiences, Insights, Challenges," 2021 IEEE/ACM 43rd International Conference on Software Engineering: Software Engineering in Practice (ICSE-SEIP), May 2021, pp. 170-179.

Long, Z. et al., "WebRR: self-replay enhanced robust record/replay for web application testing," ESEC/FSE 2020: Proceedings of the 28th ACM Joint Meeting on European Software Engineering Conference and Symposium on the Foundations of Software Engineering, Nov. 8, 2020, pp. 1498-1508.

Thome, J. et al., "Search-Based Security Testing of Web Applications," Proceedings of the 7th International workshop on search-based software testing, Jun. 2, 2014, pp. 5-14.

Thummalapenta, S. et al., "Automating Test Automation," 34th international conference on software engineering (ICSE). IEEE, Jun. 2, 2012, pp. 881-891.

Thummalapenta, S. et al., "Efficiently Scripting Change-Resilient Tests," Proceedings of the ACM SIGSOFT 20th International Symposium on the Foundations of Software Engineering, Nov. 11, 2012, pp. 1-4.

Yandrapally, R. et al., "Robust Test Automation using Contextual Clues," Proceedings of the 2014 International Symposium on Software Testing and Analysis, Jul. 21, 2014, pp. 304-314.

PCT International Search Report and Written Opinion, PCT Application No. PCT/IB2023/055784, Sep. 18, 2023, 8 pages.

Hoang, T. et al., "PatchNet: A Tool for Deep Patch Classification," 2019 IEEE/ACM 41st International Conference on Software Engineering: Companion Proceedings, arXiv:1903.02063v2, Mar. 26, 2019, pp. 83-86.

* cited by examiner

SCALABLE CODE TESTING AND BENCHMARKING

BACKGROUND

1. Technical Field

The subject matter described relates generally to source code management (SCM) and, in particular, to testing and benchmarking commits made to source code repositories in a continuous delivery (CI) and/or continuous deployment (CD) process.

2. Background Information

In software development, agile practices include requirements discovery and solutions improvement through the collaborative effort of self-organizing and cross-functional teams with their customers and/or end users, adaptive planning, evolutionary development, early delivery, continual improvement, and flexible responses to changes in requirements, capacity, and understanding of the problems to be solved. Recently, more and more developers have adopted agile software development. A recently conducted survey from KPMG with 120 companies from 17 countries revealed that 70% of them have already shifted to or are in the process of shifting towards agile. The main motivation for this shift is product delivery at a higher speed while increasing customer satisfaction.

The rising popularity and adoption of source code management (SCM) systems in combination with Continuous Integration and Continuous Delivery (CI/CD) processes have contributed to the adoption of agile software development. While SCM systems enable developers to track code changes, maintain a history of these changes and roll back or revert changes, CI/CD provides automation and tools around the integration and deployment of code changes (e.g., compilation, syntax checks, compliance checks, execution of unit-tests, security tests, etc.).

SUMMARY

Principles described herein are related to a method for testing and benchmarking commits made on code repositories. The method may be performed by a source code management (SCM) system. The SCM system extracts commits made from a history of a first (source) code repository. The history records a sequence of commits made on the first code repository. Each commit includes at least one change made on at least one file in the first code repository. The SCM system combines at least a subset of the commits into a sequence of patches. Each patch includes code changes that occurred during consecutive commits. The SCM system establishes a connection with a system under test (SUT) having a second (target) code repository. The second code repository corresponds to a historical version of the first code repository before the extracted commits were made. The sequence of patches is then applied to the second code repository sequentially. The application of the sequence of patches includes applying one patch in the sequence to the second code repository and monitoring performance of the SUT after the application of the patch on the SUT. Responsive to determining that the SUT performs as expected after the application of the patch, the next patch in the sequence is applied to the second code repository.

In some embodiments, monitoring the performance of the SUT after the application of the patch includes executing a script configured to collect data associated with the performance of the SUT after the patch is applied, and determining whether the SUT performs as expected based on the collected data. In some embodiments, the data is collected via an API that triggers execution of the script responsive to the application of each patch.

In some embodiments, the extraction of the commits from the history includes extracting a subset of commits made based on a specified criterion and combining only the subset of the commits into the sequence of patches. In some embodiments, the specified criterion includes a time frame having a starting time and an ending time, and extracting the subset of commits includes extracting commits made within the time frame.

In some embodiments, the specified criterion includes an allow list that specifies one or more files that are allowed to be modified, and extracting the subset of commits includes extracting commits that modify at least one file specified in the allow list. In some embodiments, extracting commits that modify at least one file specified in the allow list includes: for each commit in the history, generating a first hash based on the one or more files in the allow list before the commit is made, generating a second hash based on the one or more files after the commit is made, and determining whether the first hash and the second hash are different. Responsive to determining that the first hash and the second hash are different, it is determined that the commit modifies at least one file in the allow list. Responsive to determining that the commit modifies at least one file in the allow list, the commit is extracted.

In some embodiments, combining the extracted commits into a sequence of batches includes combining every N consecutive commits of the extracted commits into a single patch.

In some embodiments, the method further includes initializing a new repository on the SUT as the second code repository based on a historical version of the first code repository from before at least the subset of commits were made. In some embodiments, the method further includes initializing the SUT in a container based on a container image.

DETAILED DESCRIPTION

Figure 1:
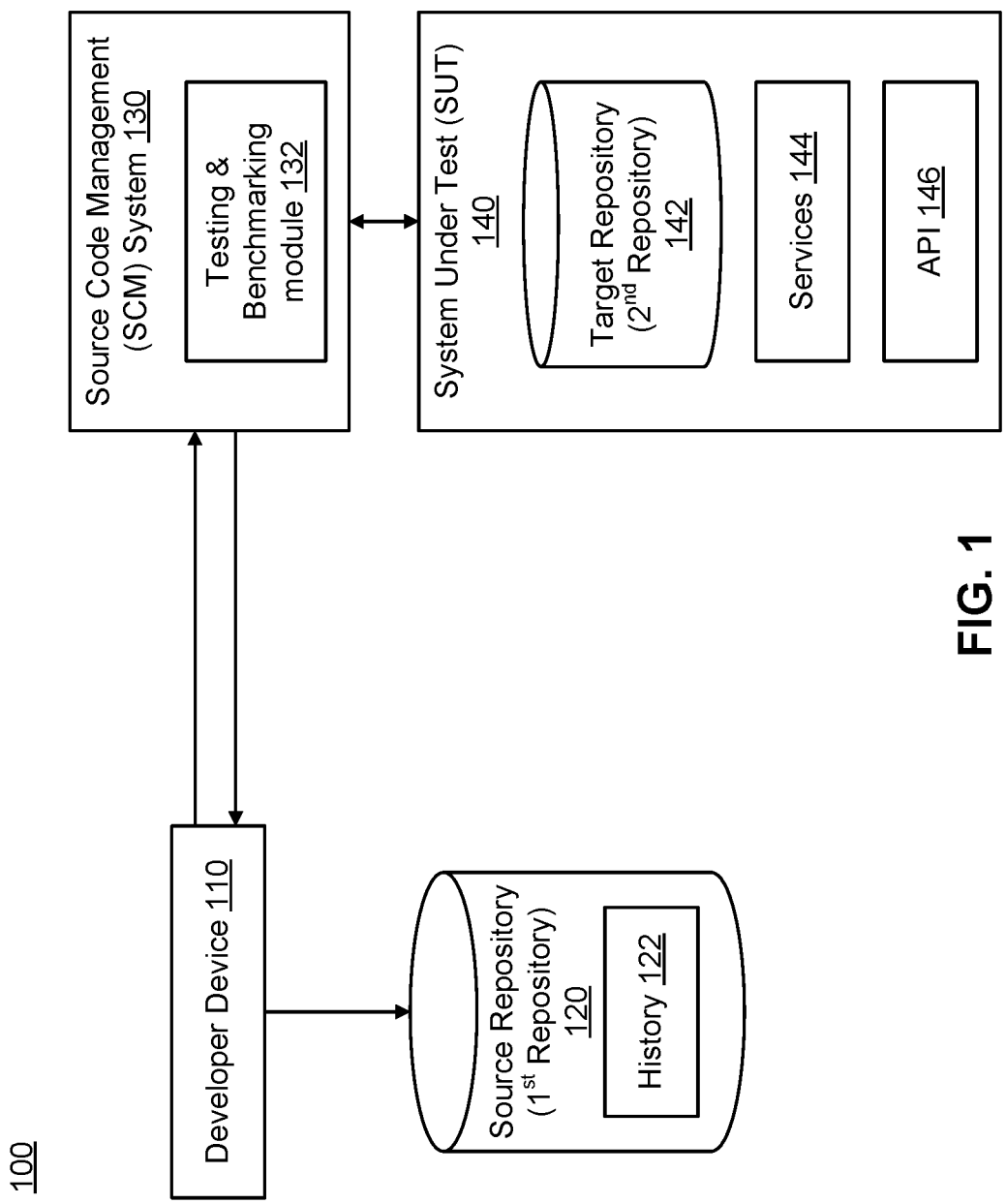
FIG. 1 is a block diagram of a networked computing environment in which a source code management (SCM) system may be implemented, according to one embodiment.

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Software developers are often working with operations and security teams to integrate security earlier in the application lifecycle, thus taking on responsibility for application security and operation as part of their workflow. Such a software development philosophy is also referred to as DevSecOps. Continuous Integration (CI) and/or continuous development (CD) practices build the foundation of DevSecOps, aiming to streamline the process of software development by automatically ensuring a certain level of quality (such as fewer bugs and/or fewer security issues) for newly shipped software features while maintaining a high velocity with which they are shipped and providing short feedback cycles for customers. These short feedback cycles can be used to monitor the impact of a feature from the point where it is shipped and inform developers and product managers about the success or failure of a given deployment which can then be used to make data-driven decisions about feature integration, deprecation, and/or improvement. This data-driven decision-making (DDDM) process is a valuable part of agile software development that provides systematic evolution of a software product or service.

However, this leads to a chicken-or-egg problem: a feature, albeit a small one, has to be deployed or shipped before its impact can be measured. DDDM generally requires the data to be collected to assess the value of the feature in the first place. Shipping a feature without any data about its impact entails the risk of having to remove it if it does not perform as expected. In addition, integrating or partially integrating proof-of-concept (which may not necessarily be robust product features) may increase risks concerning the stability and security of the product. To mitigate these problems, developers and product managers may limit the velocity with which new features are developed and deployed, which goes against the agile philosophy.

While commonly applied software testing best practices, such as the use of staging environments, automated system/integration testing strategies, and feature flags behind which features can be gated, may help partially address the stability and potential security issued, they do not provide insights with regards to DDDM for which more targeted testing strategies exist, such as variant testing.

A/B testing, an instance of variant testing, may help with DDDM by running controlled experiments that were not yet fully deployed; new features are evaluated by assessing interactions with a selected group of users presenting different variants of the test subject. A/B testing is most commonly applied to assess user interface changes. However, variant testing strategies such as A/B testing are usually applied to monitor customer experience, mostly through user-interface integrations. These forms of testing strategies are not always applicable to highly automated environments.

An SCM system and/or a testing and benchmarking method described herein addresses the above-described problems by enabling developers and product managers to run and assess the result of DDDM experiments without having to deploy the feature to production, and thus, it does not limit the velocity with which developers can prototype new ideas.

Example Systems

FIG. 1 is a block diagram of one embodiment of a network computing environment 100 in which an SCM system may be used. In the embodiment shown, the environment 100 includes a developer device 110, a source repository 120, the SCM system 130, and a system under test (SUT) 140. In other embodiments, the network computing environment 100 may include different or additional elements. Furthermore, the functionality the functions may be distributed among the elements in a different manner than described.

The developer device 110 is a computing device configured to modify or make commits to the source repository 120 (also referred to as a first repository). A commit is a change made to a file or a set of changes made to a set of files. The SCM system 130 is a computer system that tracks and provides control over changes to the code stored in the source repository 120. For example, in some embodiments, when a commit is made, the SCM system 130 may create a unique ID and keep a record of the specific changes committed along with who made them and when the changes were made, etc. Such a record is also referred to as a commit record (denoted by C). For simplicity purposes, hereinafter, the term "commit" and "commit record" are used interchangeably. A collection 122 of all the commits made on the source repository 120 is also referred to as a "history" (denoted by H), where $H=\{c_1, c_2, \ldots, c_n\}$ with $c_1$ being the first commit and $c_n$ the last commit, and n denoting an index number of the last commit. In some embodiments, each commit in the history 122 has a time stamp $t(c_x)$ denotes a point in time at which $c_x$ has been included, where $t(c_x) \leq t(c_{x+1})$. The history 122 may be stored at the developer device 110, relationally to the source repository 120, a cloud storage, and/or the SCM system 130.

The SCM system 130 includes a testing and benchmarking module 132 configured to perform testing and benchmarking for the commits made to the source repository 120 via a system under test (SUT) 140. The SUT 140 may be a local or a remote service that is accessible by the testing and benchmarking module 132 via an API 146, a local tool, or provided in a form of a container image (for example a Docker image). The SUT 140 has a target repository 142 (also referred to as a second repository). The target repository 142 contains code corresponding to a historical version of the source repository 120. The SUT 140 also runs one or more services 144. In CI/CD context, a pushed commit can trigger the one or more services 144 on SUT. The one or more services 144 may include (but are not limited to) program analysis tools, build automation tools, etc.

The testing and benchmarking module 132 causes at least a subset of commits made on the source repository 120 to be applied on the target repository 142 and performs benchmark tests on the SUT 140 to determine whether the SUT 140 with the commits functions as intended. In some embodiments, the testing and benchmarking process includes three phases: (A) a record phase extracts a subset of commits that have been applied to the source code repository; (B) a patch sequence generation phase prepares a sequence of patches to be applied to the SUT 140; and (C) a monitor phase where the actual patches are applied, and the behavior of the SUT is observed and evaluated.

During the record phase, the testing and benchmarking module 132 extracts commits from the source history 122 that are relevant with respect to a given test criterion. During the patch sequence generation phase, the testing and benchmarking module 132 generates a sequence of patches. During the monitor phase, the testing and benchmarking module 132 replays the generated sequence on the SUT 140 and captures results and/or metrics by executing evaluation scripts in order to capture timing information, API 146 responses, files, etc. from the SUT 140.

In some embodiments, in the context of applying DDDM with regards to a newly implemented features, the testing and benchmarking module 132 can be used to apply an automated form of variant testing by feeding data that has been recorded in the record phase to the original, unchanged SUT, and to a modified SUT that includes the features to be evaluated. In some embodiments, the testing and benchmarking module 132 evaluates both systems by replaying the same source history to both of them and by capturing the results and metrics that are computed by configurable evaluation scripts.

In some embodiments, the captured evaluation results and metrics can be used for (1) DDDM by helping developers and product managers to better understand and quantify the impact of newly developed features before their integration into the product, and for (2) spotting and identifying bugs and/or regressions while replaying the events from the project history.

Figure 2:
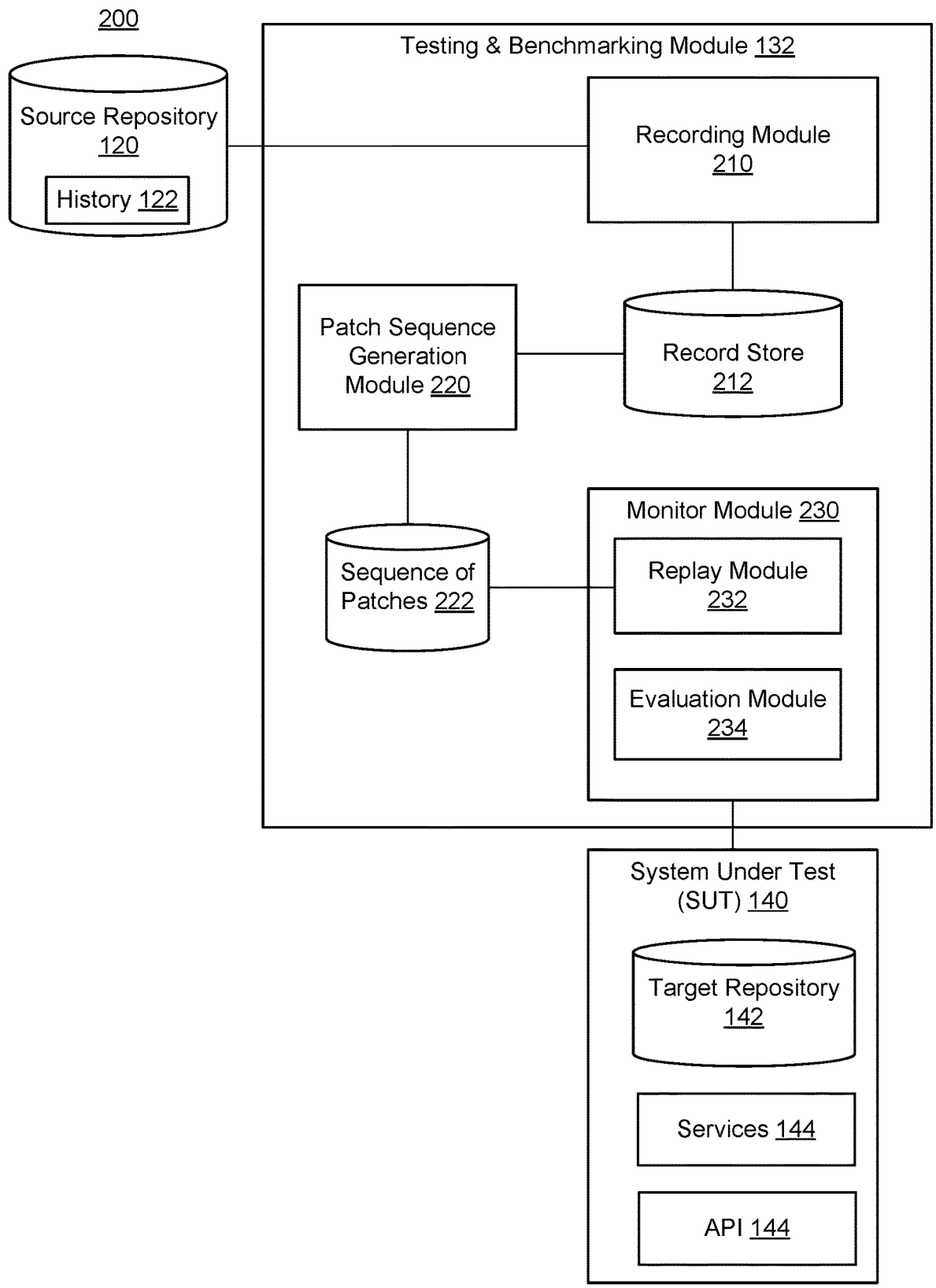
FIG. 2 is a block diagram of the testing and benchmarking module shown in FIG. 1, according to one embodiment.

FIG. 2 is a block diagram of one embodiment of the testing and benchmarking module 132. In the embodiment shown, the testing and benchmarking module 132 includes a recording module 210, a patch sequence generation module 220, and a monitor module 230. In other embodiments, the testing and benchmarking module 132 includes different or additional elements. Furthermore, the functionality may be distributed between the elements in a different manner than described.

The recording module 210 extracts at least a subset of commits from the history H of the source repository 120 that are relevant with respect to a given test criterion. The subset of commits is also referred to as a slice $S=\{c_1, c_2, \ldots c_m\}$. The slice S is then persisted in the record store 212. The extraction of a subset of commits based on test criteria may reduce reply time as well as focus the analysis on specific files, which can enable scaling of the testing and benchmarking module 132 to large repositories both in terms of history size and the number of files stored in the repository.

The test criterion may include a specified time frame $T=[T_{min}, T_{max}]$, which starts at a start time $T_{min}$, and ending at an end time $T_{max}$. In such a case, T may be used to extract a subset of commits that happened within the time frame T, which is referred to as a time slice. The time slice may be denoted by: $S'=\{c_s | c_s \in H \wedge T_{min} \leq t(c_s) \leq T_{max}\}$. Additionally, or alternatively, the test criterion may include an allow list that includes names of one or more files that the testing and benchmarking is to be focused on. Hence, we defined as slice S with $S=\{c_s | c_s \in S' \wedge \text{allowlist}(c_s)\}$, where allowlist($c_s$) evaluates to true if commit $c_s$ is related to a file that is specified in the allow list. If no allow list is provided, allowlist($c_s$) always evaluates to true. Note, the order of the commits can be preserved so that $t(c_s) \leq t(c_{s+1})$ generally holds true.

In one embodiment, extracting a subset of commits includes extracting commits that modify at least one file specified in the allow list. The subset of commits may be extracted by, for each commit in the history H 122, generating a first hash of the one or more files in the allow list before the commit is made, generating a second hash of the one or more files after the commit is made, and determining whether the first hash and the second hash are different. If the first hash and the second hash are different, the commit modified at least one file in the allow list and the commit is extracted.

The patch sequence generation module 220 generates a sequence of patches 222 based on the slice S recorded in the record store 212. In one embodiment, a patch includes code change(s) made in at least one commit that is going to be applied atomically on the target repository 142 on the SUT 140. A patch may include a sampling number N of consecutive commits, where N is referred to as a patch sampling number. As such, N consecutive commits can be combined into a single patch. In such cases, the patch sequence may be represented as a partition from the slice S in the equation below:

$$PS = \bigcup_{i=1}^{|S| \div N} \text{patch}_i \text{ with patch}_i = \bigcup_{k=(i-1)N+1}^{iN} c_k \text{ and } c_k \in S$$

For example, for slice $S=\{c_1, c_2, c_3, c_4, c_5, c_6\}$ with a patch sampling number of N=2, the patch sequence generation module 220 obtains the patch sequence $PS=\{\{c_1, c_2\}, \{c_3, c_4\}, \{c_5, c_6\}\}$, where each of the inner sets represents a patch (e.g., $\text{patch}_1=\{c_1, c_2\}$ includes two commits that are applied atomically on the target code repository 142 on the SUT 140). In addition to the time frame T and the allow list, the patch sampling number is another tool that increases the scalability of the testing and benchmarking module by making it possible to test projects with large histories.

In the embodiment shown in FIG. 2, the monitor module 230 includes a replay module 232 and an evaluation module 234. During the monitor phase, the replay module 232 causes the sequence of patches 222 to be replayed on the target code repository 142 on the SUT 140. In some embodiments, the replay module 232 does not make any assumptions about the SUT 140; it only requires the SUT 140 to be accessible by means of an API 146 that enables the monitor module 230 or any external system to (1) wait for the execution of services/actions/jobs that may be triggered when applying a patch from and (2) extract the relevant test/evaluation data. In some embodiments, the API 146 communication and the data extraction of the SUT 140 may be provided in the form of scripts as part of a configuration of the monitor module 230.

In one embodiment, the monitor module 230 natively supports the presence of a target code repository 142 in the SUT 140, which may spawn additional jobs, such as CI/CD jobs. The additional jobs may be considered as belonging to the SUT 140 itself. In the presence of a target code repository, before starting to replay the sequence of patches, the replay module 232 may initialize a new target code repository having a history based on the history or a partial history of the source repository on the SUT 240.

In some embodiments, the replay module 230 is also capable of overwriting certain files on the SUT 240. This may be advantageous for handling situations where certain code files stored on the SUT 240 may have an impact on the replays. In CI/CD environments, it is common that the CI/CD configuration itself is stored in the SCM system 130. However, it may not always be required to run the entire set of CI/CD jobs. If a benchmark test is performed to evaluate a particular job that is part of a larger CI/CD deployment, it is sufficient to run the job in isolation which can be controlled by using a custom CI/CD with which the standard configuration could be overwritten.

In one embodiment, the replay module 232 sequentially and iteratively applies each patch in the sequence of patches on the target code repository 142 on the SUT 140 through the API 146. In the presence of a target repository, the patches may be submitted to the target repository directly. After the application of a patch, the monitor module 234 monitors effect of the application of the patch. This step (1) ensures that the SUT works as expected (which is also referred to as testing) and (2) extracts and/or collects results and/or metrics from the SUT 140 while applying the patches by invoking evaluation scripts (which is also referred to as benchmarking). The valuation scripts may be user-defined or provided by the testing and benchmark module 132. For example, an evaluation script can collect data from an API 146 that is exposed by the SUT 140 and/or parse a structured data file (such as a JSON file or an XML file) that was generated by the SUT 140.

Example Methods

Figure 3:
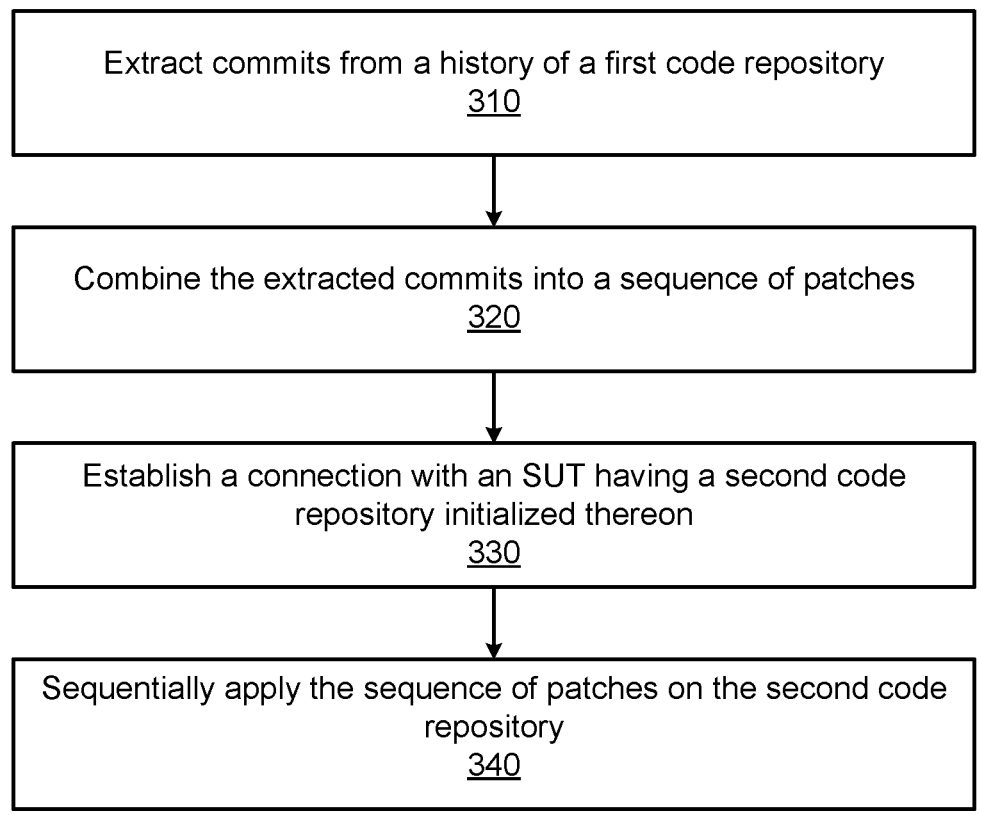
FIG. 3 is a flowchart of a method for testing and benchmarking commits made on a code repository, according to one embodiment.

FIG. 3 is a flowchart of a method 300 for testing and benchmarking commits made on a code repository, according to one embodiment. The steps of FIG. 3 are described from the perspective of the SCM 130 performing the method 300. However, some or all of the steps may be performed by other entities or components. In addition, some embodiments may perform the steps in parallel, perform the steps in different orders, or perform different steps.

The SCM system relies on a version-controlled source code repository 120 where a history 122 of the repository holds the test data. Since the SCM system leverages a source code repository 120 as input data to be tested and benchmarked, it is capable of (but not limited to) replaying histories of source code projects which is particularly useful for applying DDDM to test and assess newly developed features in a CI/CD context.

In particular, the SCM system extracts 310 commits from the history 122 of the first code repository 120. The history 122 records a sequence of commits made on the first code repository 120. Each commit includes at least one change made on at least one code file in the first code repository 120. Extracting 310 commits may include extracting a subset of commits from the history 122 based on a specified criterion. In one embodiment, for each commit, the history 122 records a time when the commit was made. The specified criterion includes a time frame having a start time and an end time. The extraction of the commits includes extracting commits made within the time frame. Additionally or alternatively, the specified criterion includes an allow list that specifies one or more files that are allowed to be modified. In such a case, the extraction 310 of the commits includes extracting commits that modify at least one file specified in the allow list.

Regardless of the precise method used to extract 310 commits, the SCM system combines 320 extracted commits into a sequence of patches. Each patch includes changes made on one or more code files that occurred during consecutive commits. In one embodiment, combining at least the subset of commits into a sequence of batches includes combining every N consecutive commits of extracted commits into a single patch, where N is a positive integer.

The SCM system establishes 330 a connection with an SUT 140 having a second code repository 142. In one embodiment, the connection with the SUT 140 is established via an API 146. The SCM system 140 may create the second code repository 142 based on a historical version of the first code repository 120 from before the extracted commits were made. Alternatively, the SCM system 140 may initiate an existing repository on the SUT 140 as the second code repository 142 based on a historical version of the first code repository 120 from before the extracted commits were made. In some embodiments, the SCM system initializes the SUT 140 in a container based on a container image.

Figure 4:
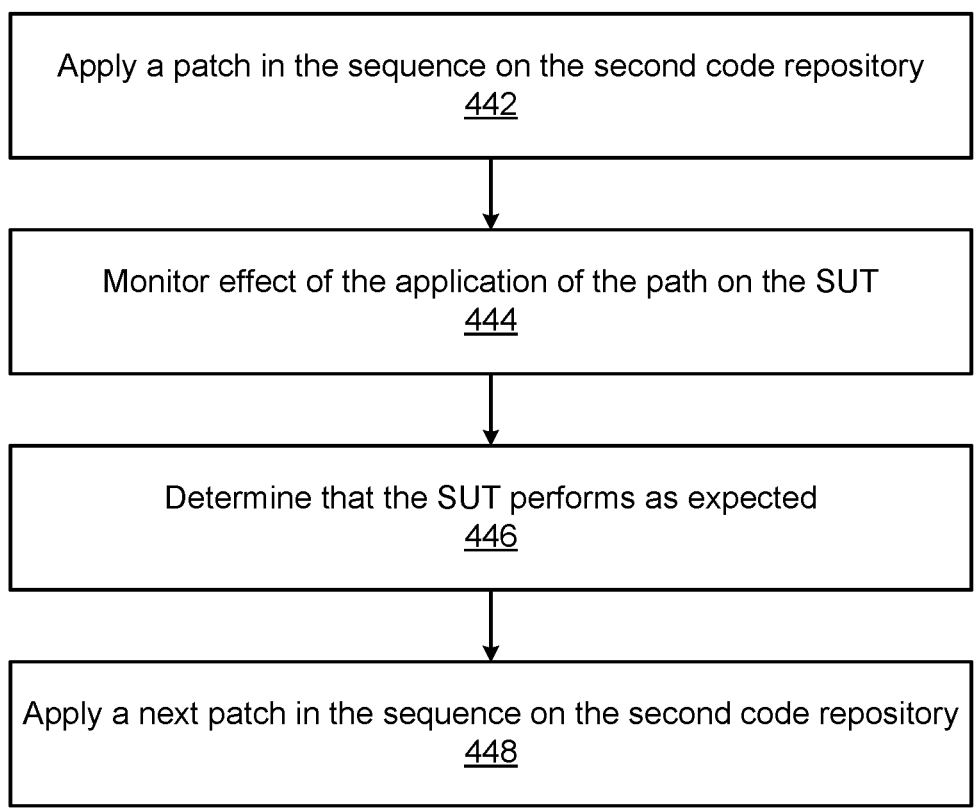
FIG. 4 is a flowchart of a method for sequentially applying a sequence of patches on a code repository of a system under test (SUT), according to one embodiment.

The SCM system applies 340 the sequence of patches to the second code repository 142. FIG. 4 is a flowchart of a method 400 for applying 240 the sequence of patches on the second code repository 142, according to one embodiment. In the embodiment shown, the SCM system 130 applies 410 a patch in the sequence to the second code repository 142. Each patch is generated by combining one or more consecutive commits. As such, the patch includes one or more changes made on one or more code files that occurred during one or more consecutive commits.

The SCM system 130 monitors 420 the effect of the application of the patch on the SUT 140. The SCM system 130 determines 430 whether the SUT 140 performs as expected. In one embodiment, the SUT 140 monitors 420 the effect of the patch by executing a script to collect data associated with the performance of the SUT after the patch is applied, and determines 430 whether the SUT performs as expected based on the collected data. The data may be collected via an API 146 that triggers execution of the script in response to the application of the patch If the SUT 140 does not perform as expected, the SCM 130 stops further application of patches. In one embodiment, the SCM 130 generates a notification to a developer that the corresponding commit caused the SUT 140 to not perform as expected. Alternatively or in addition, the SCM 130 may present the collected data to the developer for review. Conversely, if the SUT 140 performs as expected, the SCM 130 applies 440 the next patch in the sequence to the second code repository 142. This process repeats until all the patches in the sequence are applied, or when a particular commit causes the SUT not to perform as expected by a particular commit.

Computing System Architecture

Figure 5:
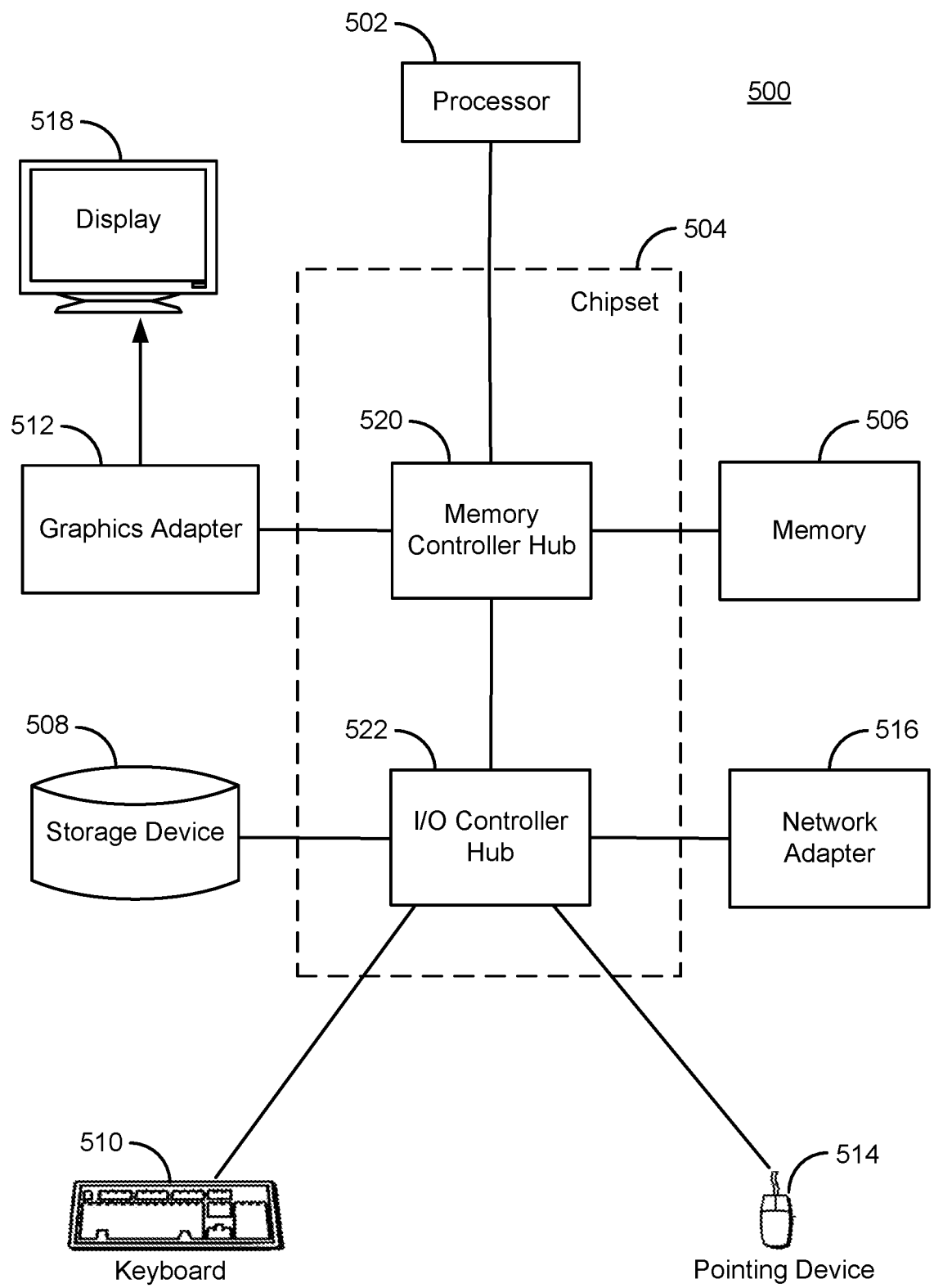
FIG. 5 is a block diagram illustrating an example computer suitable for use in the networked computing environment of FIG. 1, according to one embodiment.

FIG. 5 is a block diagram of an example computer 500 suitable for use as a developer device 110, the SCM system 130, or SUT 140, or for hosting the source code repository 120. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and may be used in combination with the keyboard 510 (which may be an on-screen keyboard) to input data into the computer system 500. The graphics adapter 512 displays images and other information on the display 518. The network adapter 516 couples the computer system 500 to one or more computer networks, such as network 170.

The types of computers used by the entities of FIGS. 1 and 2 can vary depending upon the embodiment and the processing power required by the entity. For example, a system hosting the source code repository 120 might include multiple blade servers working together to provide the functionality described while a developer device 110 might be a desktop workstation or tablet. Furthermore, computers 500 can lack some of the components described above, such as keyboards 510, graphics adapters 512, and displays 518.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for tracking vulnerabilities using scope and offset values to reduce instance of duplication. Thus, while particular embodiments and applications have been illustrated and described, it is to be understood that the described subject matter is not limited to the precise construction and components disclosed. The scope of protection should be limited only by any claims that issue.

What is claimed is:

1. A method of testing and benchmarking commits made on source code, the method comprising:
   extracting commits from a history of a first code repository, the history recording a sequence of commits made on the first code repository, each commit of the sequence of commits including at least one change made on at least one code file in the first code repository,
   wherein extracting commits comprises extracting a subset of commits from the history based on a specified criterion, and
   wherein the specified criterion includes an allow list that specifies one or more files that are allowed to be modified, and extracting the subset of commits includes extracting commits that modify at least one file specified in the allow list;
   combining the extracted commits into a sequence of patches, each patch including changes made on one or more code files that occurred during consecutive commits, wherein each patch includes a plurality of commits;
   establishing a connection with a system under test (SUT) having a second code repository, the second code repository corresponding to a historical version of the first code repository before the extracted commits were made; and
   sequentially applying the sequence of patches to the second code repository, sequentially applying the sequence of patches including:
      applying a patch in the sequence on the second code repository;
      monitoring performance of the SUT after applying the patch on the SUT; and
      responsive to determining that the SUT performs as expected after applying the patch, applying a next patch in the sequence to the second code repository.

2. The method of claim 1, wherein monitoring the performance of the SUT after applying the patch in the sequence comprises:
   executing a script configured to collect data associated with the performance of the SUT after the patch is applied; and
   determining whether the SUT performs as expected based on the collected data.

3. The method of claim 2, wherein the data is collected via an API that triggers execution of the script responsive to applying the patch.

4. The method of claim 1, wherein:
   for each commit, the history records a time when the commit is made,
   the specified criterion includes a time frame having a starting time and an end time, and
   extracting the subset of commits includes extracting commits made within the time frame.

5. The method of claim 1, wherein extracting commits that modify at least one file specified in the allow list comprises:
   for each commit in the history,
      generating a first hash based on the one or more files in the allow list before the commit is made;
      generating a second hash based on the one or more files after the commit is made;
      determining whether the first hash and the second hash are different; and
      responsive to determining that the first hash and the second hash are different, determining that the commit modifies at least one file in the allow list; and
      responsive to determining that the commit modifies at least one file in the allow list, extracting the commit.

6. The method of claim 1, wherein combining the extracted commits into a sequence of patches comprises combining N consecutive commits of the extracted commits into a single patch.

7. The method of claim 1, the method further comprising: initializing a repository on the SUT as the second code repository based on a historical version of the first code repository from before at least the extracted commits were made.

8. The method of claim 1, the method further comprising: initializing the SUT in a container based on a container image.

9. A computer program product comprising a non-transitory computer readable storage medium having instructions encoded thereon that, when executed by a processor, cause the processor to:
 extract commits from a history of a first code repository, the history recording a sequence of commits made on the first code repository, each commit of the sequence of commits including at least one change made on at least one code file in the first code repository,
  wherein extracting commits comprises extracting a subset of commits from the history based on a specified criterion, and
  wherein the specified criterion includes an allow list that specifies one or more files that are allowed to be modified, and extracting the subset of commits includes extracting commits that modify at least one file specified in the allow list;
 combine the extracted commits into a sequence of patches, each patch including changes made on one or more code files that occurred during consecutive commits, wherein each patch includes a plurality of commits;
 establish a connection with a system under test (SUT) having a second code repository, the second code repository corresponding to a historical version of the first code repository before the extracted commits were made; and
 sequentially apply the sequence of patches to the second code repository, sequentially applying the sequence of patches including:
  applying a patch in the sequence on the second code repository;
  monitoring performance of the SUT after applying the patch on the SUT; and
  responsive to determining that the SUT performs as expected after applying the patch, applying a next patch in the sequence to the second code repository.

10. The computer program product of claim 9, wherein monitoring performance of the SUT after application of a patch in the sequence comprises:
 executing a script configured to collect data associated with performance of the SUT after the patch is applied; and
 determining whether the SUT performs as expected based on the collected data.

11. The computer program product of claim 10, wherein the data is collected via an API that triggers execution of the script responsive to applying the patch.

12. The computer program product of claim 9, wherein:
 for each commit, the history records a time when the commit is made,
 the specified criterion includes a time frame having a starting time and an end time, and
 extracting the subset of commits includes extracting commits made within the time frame.

13. The computer program product of claim 9, wherein extracting commits that modify at least one file specified in the allow list comprises:
 for each commit in the history,
  generating a first hash based on the one or more files in the allow list before the commit is made;
  generating a second hash based on the one or more files after the commit is made;
  determining whether the first hash and the second hash are different; and
  responsive to determining that the first hash and the second hash are different, determining that the commit modifies at least one file in the allow list; and
  responsive to determining that the commit modifies at least one file in the allow list, extracting the commit.

14. The computer program product of claim 9, wherein combining the extracted commits into a sequence of patches comprises combining every N consecutive commits of the extracted commits into a single patch.

15. The computer program product of claim 9, the non-transitory computer readable storage medium having additional instructions encoded thereon that, when executed by a processor, cause the processor to:
 initialize a repository on the SUT as the second code repository based on a historical version of the first code repository from before at least the extracted commits were made.

16. The computer program product of claim 9, the non-transitory computer readable storage medium having additional instructions encoded thereon that, when executed by a processor, cause the processor to:
 initialize the SUT in a container based on a container image.

* * * * *